May 12, 1970   HANS-PETER SCHABERT   3,511,046
GAS TURBINE POWER PLANT

Filed Nov. 1, 1968   3 Sheets-Sheet 1

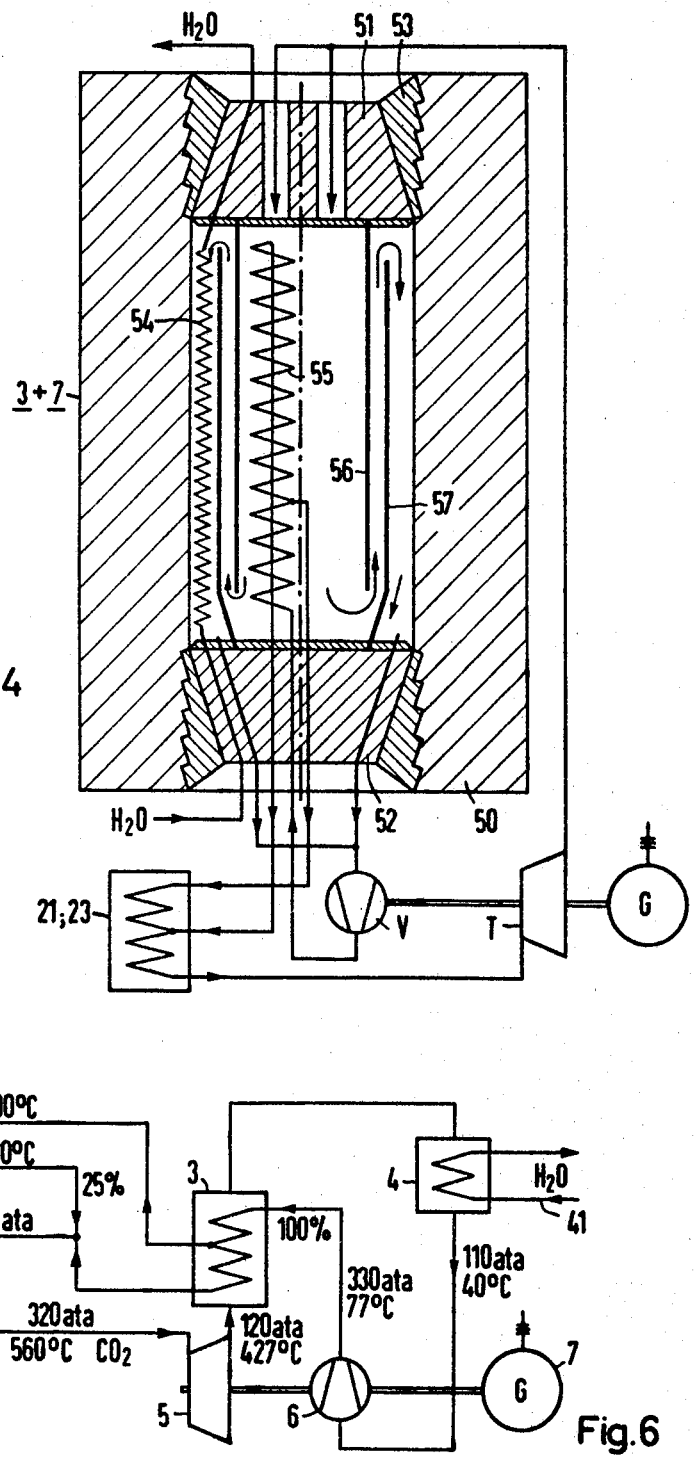

3,511,046
Patented May 12, 1970

3,511,046
GAS TURBINE POWER PLANT
Hans-Peter Schabert, Erlangen, Germany, assignor to Siemens Aktiengesellschaft, a corporation of Germany
Filed Nov. 1, 1968, Ser. No. 772,640
Claims priority, application Germany, Nov. 2, 1967,
P 1,601,659
Int. Cl. F01k 25/00, 3/18
U.S. Cl. 60—36                                    11 Claims

ABSTRACT OF THE DISCLOSURE

Gas turbine power plant fired by fossil fuel has a circulatory system including a boiler for heating a working medium with combustion gas of the fired fuel, a gas turbine connected to the boiler and operated by the heated working medium, a recuperative heat exchanger having a high-pressure side connected to the boiler and a low-pressure side connected to the discharge end of the gas turbine for utilizing heat from spent working medium to heat working medium contained in the high-pressure side, cooler means connected to the low-pressure side of the recuperative heat exchanger for cooling the spent working medium, compressor means connected between the cooler means and the high-pressure side of the recuperative heat exchanger for compressing the cooled working medium, the working medium having a mean specific heat in the high-pressure side of the recuperative heat exchanger at least 5% higher than that of the spent working medium in the low-pressure side of the recuperative heat exchanger and means for conducting out of the recuperative heat exchanger a branch flow of the working medium from the high-pressure side of the recuperative heat exchanger into heat-exchanging contact with the combustion gas.

---

My invention relates to gas turbine power plant and, more particularly, one that is fired by fossil fuel.

Gas turbine power plants which, in use, can accommodate peak loads are already known. They operate with aircraft engines or similar hot air turbines and are capable of being started-up very rapidly. The power producible by such a gas turbine is small (at most 50 mw.e.) due to the bulky structure thereof, and the efficiency and durability thereof is similarly limited. Gas turbines have however practically found no acceptance as large peak power plants, which are operated instead with the aid of a conventional steam process. Such installations are very large in size and costly in view of the numerous auxiliary equipment that is required, such as especially the auxiliary apparatus necessary for processing the feedwater in spite of numerous attempts to economize (at the expense of the efficiency), and moreover the time required for starting up the plant is relatively long.

High pressure processes with $CO_2$ or noncombustible organic gases such as $C_4F_8$, for example, have been proposed heretofore for gas turbine power plants wherein the medium is compressed in condensed state so that relatively good theoretical process efficiencies are attained and the turbines can be held to relatively small dimensions. According to these proposed processes, the compressed working medium flows in sequence through the high-pressure side of a recuperative heat exchanger, the fired boiler, the turbine, the low-pressure side of the recuperative heat exchanger, the water cooler and the compressor. Similarly as for processes employing gases that are nearly ideal (such as air or helium), there is presented the problem of utilizing the remaining heat in the combustion gases, which would otherwise go to waste, below the temperature at which the compressed working medium leaves the recuperative heat exchanger. The utilization of the remainder heat of the combustion gases for preheating combustion air requires relatively large additional construction costs and is subject to considerable losses.

It is accordingly an object of my invention to provide gas turbine power plant which avoids the disadvantages of the heretofore known power plants of this general type and which moreover, though having a relatively simple construction and relatively high start-up speed, can develop a relatively high power output at reasonable efficiency.

It is a further object of my invention to provide such gas turbine power plant which will offer a solution for the aforementioned problem of utilizing the remainder heat of the combustion gases in a particularly simple and efficacious manner.

With the foregoing and other objects in view, I provide gas turbine power plant, according to my invention, having a circulatory system in which the mean specific heat of the gas working medium in the high-pressure side of the recuperative heat exchanger is at least 5% higher than that of the medium in the low-pressure side of the recuperative heat exchanger, and which also has means for conducting at least partly out of the recuperative heat exchanger a branch flow of the working medium from the high-pressure side of the recuperative heat exchanger into heat-exchanging contact with the combustion gas that heats the boiler of the system. This can be effected, for example, in accordance with another feature of my invention by removing the branch flow of high pressure gas from the recuperative heat exchanger and supplying it to an after-connected heat-exchange contacting surface located in the boiler of the system after the branch flow has been heated to such temperature in the recuperative heat exchanger which is at least required in view of the dewpoint of the combustion gas, on the grounds of outer corrosion of the pressure-conductive tubes.

The desired different specific heats respectively on the high and low-pressure sides of the recuperative heat exchanger are produced, for example, when $CO_2$ is the working medium, if the pressure in the boiler is chosen very high, such as 300 ata., for example. A relatively good heat transfer in the tubes is then simultaneously attained which, in that region of the boiler is of special advantage, in that the heat transfer from the combustion flames to the tubes thereat takes place essentially through radiation and is very intense.

With $CO_2$ as working medium, if the conditions at the compressor inlet are selected (for example 110 ata., 40° C.) so that the gas has a density of more than 200 kg./m.³ ($CO_2$ gas has this density for example at 63 ata., 25° C. or at 72 ata., 40° C.), but not condensed, then not only is the desired difference in specific heats attained, but also additional advantages result therefrom.

In contrast to the heretofore known process proposals with condensation of the working medium (for example $CO_2$ or $C_4F_8$) before inlet into the compressor, the aforementioned preferably supercritical condition of the gas upstream of the compressor has the advantage that cavitation is precluded in the compressor (pump). In the case of $CO_2$ as working medium, which is especially suitable due to its chemical stability and its limited corrosive action, the further advantage is added that the compressor inlet temperature does not have to fall below 30° C. (critical condition 31° C., 75 ata.) which is very difficult to control in the summer for river water temperatures of 22° C. On the contrary, for example at 100 to 120 ata. compressor inlet pressure, the general or overall efficiency is barely affected when the compressor inlet temperatures rises to 40° C. This permtis considerable economizing on the cooling water side (small pumps and small line cross sections) or the use of cooling towers for a deficiency of water, or the use of an intermediate water cooling loop in case it should appear to be advantageous for practical reasons (rust formation or soil deposits). A further advantage is provided by effecting the regulation or control of the turbine output at least partly in a steady and relatively loss-free manner so that the inlet pressure of 110 ata. drops to 76 ata., for example, in the compressor, and accordingly the inlet temperature of 40° C. is simultaneously reduced to 32° C. for example. The density of the working medium at the compressor inlet drops, due to these measures, to about half its value, and the mass throughput or flow-through rate through the entire circulatory loop is correspondingly reduced. It can thus be desirable to dispose a guiding apparatus at the compressor inlet whereby the working medium flows to the compressor with a twisting motion. Thereby, the fact must be taken into consideration that, in contrast to the normal operation, for the aforementioned partial load operation; an appreciable compression occurs in the compressor which manifests itself in a relatively excessive volume throughput at the compressor inlet.

Obviously, the partial load operation can be produced by increasing the cooling water temperature, instead of by decreasing the pressure. This measure is primarily of interest for short-term control operations, wherein the draining off of large quantities of working medium from the circulatory loop gives rise to difficulties. Therefore, the intermediate circulatory loop employable due to the fact that condensation is dispensed with, offers the advantageous possibilities that it can be traversed by a water quality which precludes corrosion damage at the pressure-conducting tubes (for example the plain steel) as well as the deposit of solids occurring with river water at more than 45° C. For example, a slight temperature increase of 40° to 60° C. at the inlet of a compressor supplied with $CO_2$ at 110 ata. pressure produces a reduction in the density of the medium (and therewith approximately in the weight throughput or flow-through rate) of more than half, i.e. about 320 kg./m.$^3$ instead of 670 kg./m.$^3$. The use of conventional bypass regulation or control can be additionally advantageous for very rapid changes in load.

In contrast on the other hand to the heretofore known gas turbine processes with intermediate cooling in the compressor part such intermediate cooling is not required upstream of the compressor for the proposed conditions. The compressor can therefore be of extremely simple construction, for example a one-stage radial compressor, the number and size of the tubes or lines can be reduced, and the recuperative heat exchanger and the $CO_2$-water cooler can moreover be installed in a single receptacle. This simple construction is of great advantage especially for a peak power plant. For such a power plant, the fixed costs for capital service and personnel enter much more significantly into the current costs than for a base load power plant, while the efficiency plays a less important role. For this reason, the temperature in the boiler is limited for example to 500° C. in order to be able to employ therein and in the turbine inexpensive low-alloy steels.

Other features which are considered as characteristic for the invention are set forth in the appended claims.

Although the invention is illustrated and described herein as embodied in gas turbine power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4 is a diagrammatic sectional view of a combined recuperative heat exchanger and $CO_2$-water cooler connected to other schematically shown components of the power plant;

FIG. 6 is another schematic circuit diagram of a modified embodiment of the power plant of my invention.

Figure 1:
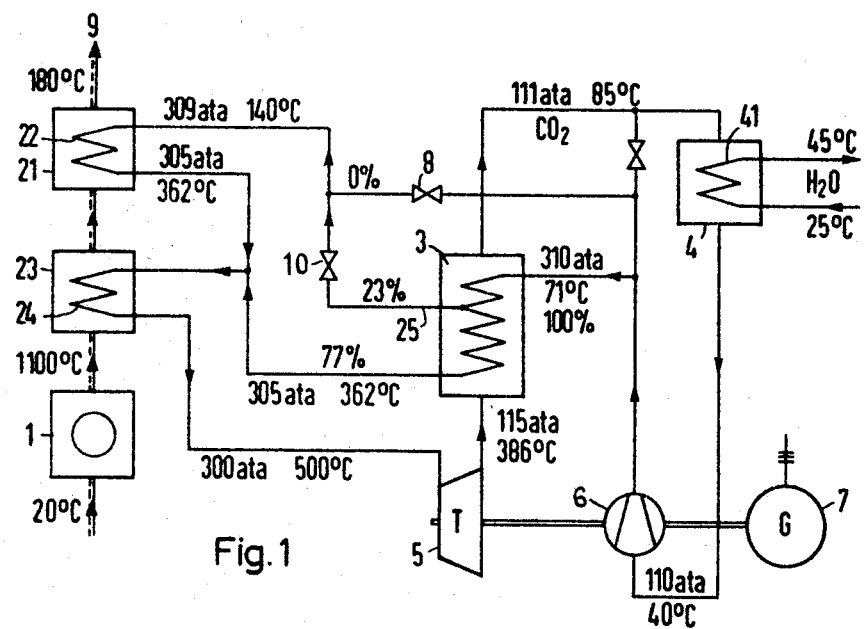
FIG. 1 is a schematic circuit diagram of a power plant according to my invention.

Referring now to the drawings, and first particularly to FIG. 1 thereof, there is shown a furnace 1 fired by heavy fuel oil to which combustion air at 20° C. is supplied and from which combustion gas at 1100° C. is discharged. The combustion gas then passes through heat exchangers 23 and 21 in a boiler and discharges from the power plant through a chimney 9 at a temperature of about 180° C. In the heat exchangers 21 and 23, the combustion heat is transferred to a carbon dioxide circulatory loop which includes heat exchanger surfaces or coils 22 and 24, a turbine 5 and a compressor 6 as well as a cooler 4 and a recuperative heat exchanger 3. The carbon dioxide gas passes from the heat exchanger 23 with a pressure of 300 ata. and a temperature of about 500° C. to the turbine 5 and discharges from the latter with a temperature of about 386° C. and a pressure of 115 ata. After the working gas then flows through the recuperative heat exchanger 3 it reaches the cooler 4 and is cooled therein by coolant water 41 of an intermediate water cooling circuit to a temperature of 40° C., having therewith a pressure of 110 ata. at the inlet to the compressor 6. The compressor 6 is mounted with a generator 7 and the turbine 5 in a normal manner on a common shaft.

The cooled gas is brought up to a pressure of 310 ata. and a temperature of 71° C. in the compressor 6, and flows therefrom to the recuperative heat exchanger. A part of the gas, namely about 23% thereof, leaves the recuperative heat exchanger 3 at a temperature of 140° C. and flows to the heat exchanger 21 and to the heating surfaces 22 therein. The remaining part of the gas, namely about 77% thereof, is heated further to 362° C. in the recuperative heat exchanger 3 by the spent gas discharging from the turbine 5, which is the same temperature at which the 23% gas part leaves the heat exchanger 21. Both branch flows of the gas combine to pass through the coils 24 of the heat exchanger 23 at a pressure of 305 ata. and are heated therein to a temperature of 500° C. A valve 10 serves for accurately adjusting the branch flow to a value at which the sum of the heat losses at the chimney 9 and at the cooler 4 is a minimum for the given heating surfaces in the boiler and in the recuperator. A valve 8, which was closed in the foregoing example, is partly opened when, due to a change in fuel and therewith in the dewpoint of the spent gas, a lower temperature of the heating surfaces at the cold end of the boiler should be allowed.

Figure 2:
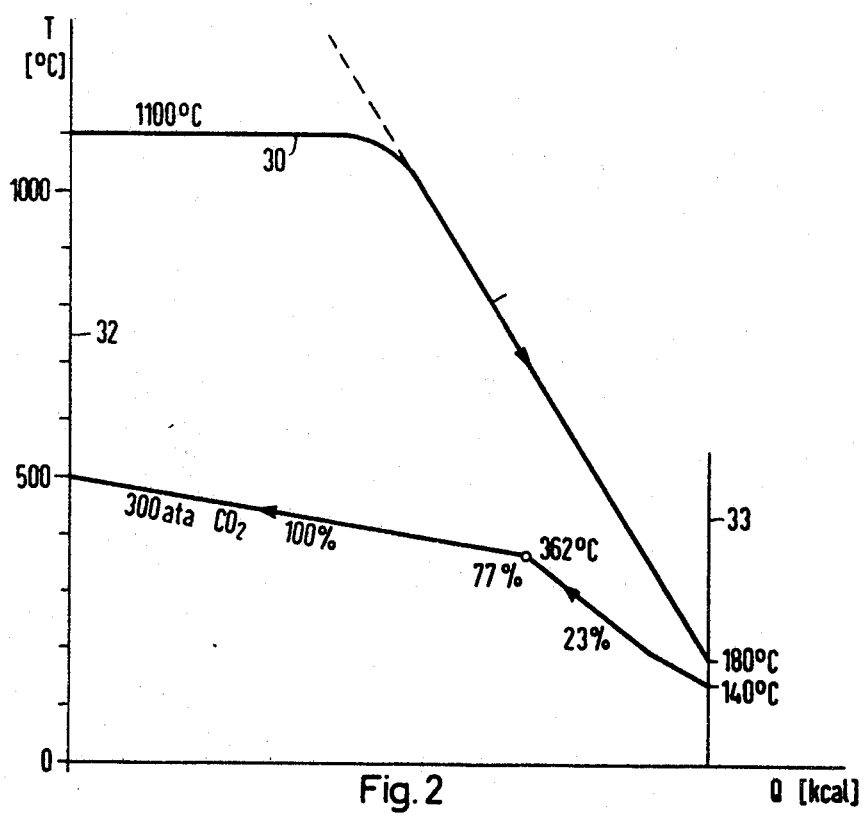
FIG. 2 is a plot diagram of temperature against heat within the boiler of the power plant.

In FIG. 2 there is shown the temperature distribution of the combustion gas 30 and of the working medium 31 in the boiler, from the surface 32 to the chimney 33.

Figure 3:
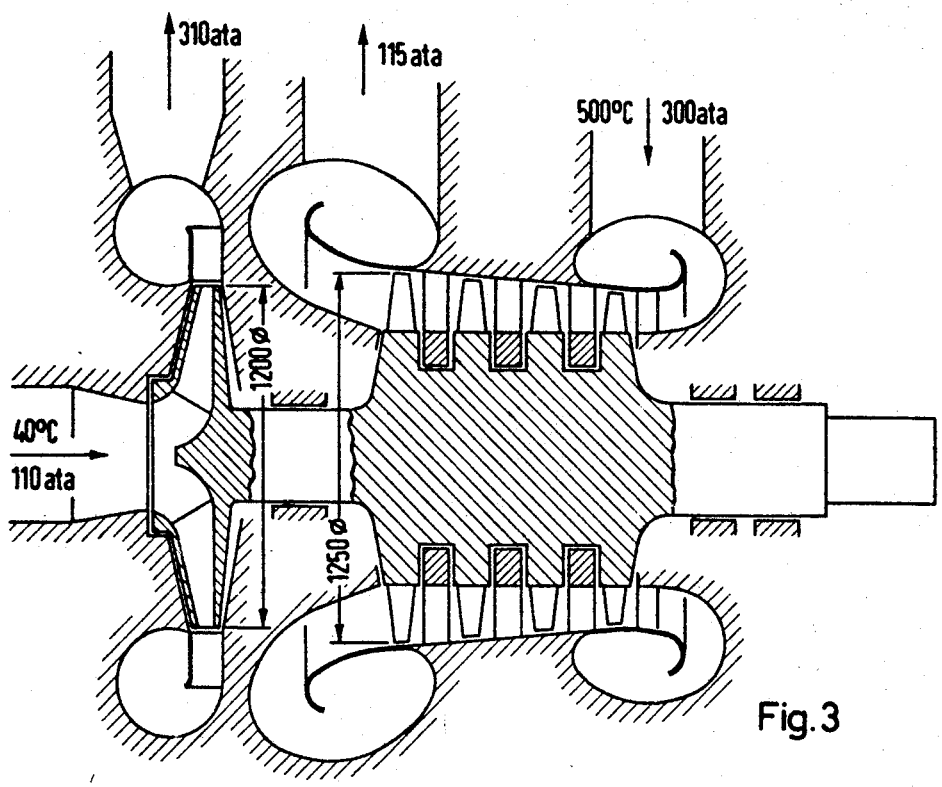
FIG. 3 is a schmatic longitudinal sectional view of the power plant turbine and compressor.

The gas turbine 5 employed in the circulatory system of the power plant of my invention is shown schematically in section in FIG. 3 as being combined with a radial compressor. It may be noted therefrom that, as compared to steam turbines, my invention relates to a non-conventionally small combination having a relatively low peripheral speed so that, to improve the efficiency of the turbine, additional sealing rings or gaskets can be provided at the rotor blades opposite the turbine housing.

For the high pressure shaft sealing, oil stuffing boxes can be installed as are employed and suggested, for example, for circulating blowers or pumps in reactor technology. In radial compressors, a spiral housing with more than one connecting tube may be used to attain an especially high efficiency.

Since the coolant enters the compressor at a relatively high density i.e. the volume thereof is about 1.5 liters per kilogram, the power requirement of the compressor is relatively low i.e. about 30% of the generator output. The general or over-all efficiency for the foregoing example of a peak power plant is about 32%.

FIG. 4 shows a possible embodiment of a combined recuperative heat exchanger 3 and a cooler 4. Both apparatuses are in the form of coiled tube bundles and are located in a prestressed concrete pressure vessel 50. The pressure vessel 50 is assembled of prefabricated components in the cylindrical part thereof, and is provided with two conical stoppers 51 and 52 which are slightly displaceable relative to the wedges 53 under internal pressure. Both the stoppers and the cylindrical portion of the pressure vessel 50 are provided on the interior thereof with a water-cooled steel sealing skin having spring-elastic expansion equalizers (torus) in the corners thereof. A thermal inner insulation is provided only in the vicinity of the stoppers.

The low pressure gas contacting the sealing skin in the cylinder portion of the pressure vessel 50 has a temperature of only 85° C. or less. The sealing skin is supplied with the same cooling water as the tube bundle 54 of the cooler 4 and acts as additional cooler heat transfer surfaces.

In the vicinity of the coiled-tube bundle 55 of the recuperative heat exchanger, the low pressure gas flows downwardly, as viewed in FIG. 4, and releases its heat content to the ascending high pressure gas. To avoid thermal instability, the low pressure gas is again conducted through the annular gap between the guide plates 56 and 57 before it is admitted to the cooler part of the pressure vessel 50. The inner guide plate 56 is thermally insulated. Within this insulation of plate layers the gas has a temperature steadily above 85° C. and, accordingly, the insulating action is not subjected to an excessive density of the medium in the stagnating gaps.

Figure 5:
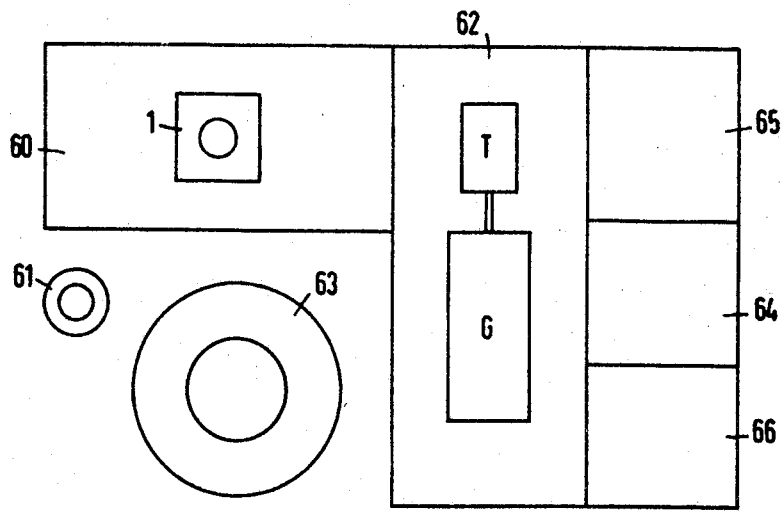
FIG. 5 is a floor plan of the power plant.

FIG. 5 discloses the layout or floor plan of a large power plant according to the aforedescribed embodiment of my invention. The boiler building 60 houses the furnace 1 and the heating surfaces or coils 21 and 24. The chimney 61 is located adjacent thereto. The turbine T and the generator G as well as the auxiliary equipment 64, the observation tower 65, and the cooling water supply 66 are mounted in the main building 62. The concrete pressure vessel 63, with recuperative heat exchanger and cooler therein is so disposed that relatively short lines can connect the components contained therein with the turbine T and the boiler building 60.

From the foregoing, it is clear that such a gas turbine process permits a relatively simple construction of the power plant installation whereby the gas turbine not only offers great advantages in space-saving and cost reduction as against steam turbines, but also requires fewer auxiliary machines and no feed water preparation or purification systems. In conjunction therewith, there is a reduction in the electrical switch gear which furthermore becomes more easy to survey. The entire installation requires little maintenance, particularly with respect to the turbine which exhibits no erosion phenomena.

These advantages are further underscored by the fact that $CO_2$ is used instead of water, thereby eliminating the danger of chlorine separation when using the latter, which could cause grave corrosion damage in a steam generator.

In the embodiment of FIG. 6, the air and/or fuel is preheated from 20° C. to 240° C. in a preheater by heat transfer from the combustion gas. The conditions of temperature and pressure of the $CO_2$ gas are indicated in FIG. 6 and differ somewhat from those of the embodiment of FIG. 1. Components identified by the same reference numerals in both FIGS. 1 and 6 are similar.

As aforementioned, the invention of the instant application is obviously not limited to the special solutions exemplified by the aforedescribed and illustrated embodiments. Thus, for example, to facilitate start-up and shut-down of the power plant, as well as partial load operation thereof, the aforedescribed single shaft turbine can be replaced by a two-shaft turbine, such as is disclosed in copending application Ser. No. 755,008 filed on Aug. 23, 1968, of which I am coinventor, wherein both shafts can be disposed, if desired, in a single housing.

The temperature of the working medium heated in the boiler and the efficiency therewith can be sharply increased, in which case the greater capital expenditures for high-alloy steels must be taken into consideration.

Furthermore, other fuels than heavy oil can be employed. Thereby, the tube wall temperature, permissible for corrosion reasons at the cold end of the boiler, varies if possible so that the high pressure gas branch flow can be withdrawn at a lower temperature out of the recuperative heat exchanger or, where possible, directly from the compressor. Soft or hard coal can require the preheating of a partial flow of air for operating the powdering mill therefor, or, in the case for example of refuse incineration, an additional preheating of the entire air adjacent the division of the high pressure gas flow, can be used, as shown for example in FIG. 6. The size of the high pressure gas branch flow can be varied within wide limits in accordance with economic optimization. The branch flow can be taken from a heating surface located directly in the recuperative heat exchanger rather than from a tap of the tubing in the recuperative exchanger.

Obviously the application of the power plant is not limited to peak operation. An intermediate superheater can also be provided in the boiler or an intermediate cooler in the compressor stage, which, however, primarily disturbs the basic simplicity of the installation and may perhaps require an additional chamber in the concrete pressure vessel with varying pressure. The gas can be further expanded in the turbine or the gas working medium can be condensed upstream of the compressor.

I claim:

1. Gas turbine power plant fired by fossil fuel comprising a circulatory system including a boiler for heating a working medium with combustion gas of the fired fuel, a gas turbine connected to said boiler and operated by said heated working medium, a recuperative heat exchanger having a high-pressure side connected to said boiler and a low-pressure side connected to the discharge end of said gas turbine for utilizing heat from spent working medium to heat working medium contained in said high-pressure side, cooler means connected to said low-pressure side of said recuperative heat exchanger for cooling said spent working medium, compressor means connecter between said cooler means and said high-pressure side of said recuperative heat exchanger for compressing the cooled working medium, said working medium having a mean specific heat in said high-pressure side of said recuperative heat exchanger at least 5% higher than that of said spent working medium in said low-pressure side of said recuperative heat exchanger, and means for conducting out of said recuperative heat exchanger a branch flow of said working medium from said high-pressure side of said recuperative heat exchanger into heat-exchanging contact with the combustion gas.

2. Gas turbine power plant according to claim 1 wherein said working medium is $CO_2$.

3. Gas turbine power plant according to claim 1 wherein noncondensed working medium having a density of at least 200 kg./m.³ at full-load operation of the plant is supplied to said compressor means.

4. Gas turbine power plant according to claim 3 wherein said noncondensed working medium of at least 200 kg./m.$^3$ density is at supercritical pressure and substantially critical temperature.

5. Gas turbine power plant according to claim 1 including an auxiliary turbine for driving said compressor means, said auxiliary turbine being operable independently of the first-mentioned gas turbine for facilitating start-up, shut-down and partial load operation of the plant.

6. Gas turbine power plant according to claim 1 including a prestressed concrete receptacle, said recuperative heat exchanger and a first cooler of said cooling means, as viewed in flow direction of said circulatory system, are housed therein.

7. Gas turbine power plant according to claim 6 wherein said first cooler is disposed along a cylindrical inner surface of said pressure vessel, said pressure vessel being insulated in the interior surface thereof except in the region of said cylindrical inner surface.

8. Gas turbine power plant according to claim 1 including a power regulation system for the gas turbine circuit responsive to variation in the temperature of the working medium at the inlet to the compressor.

9. Gas turbine power plant according to claim 1 wherein said compressor has means for effecting compression of the working medium in one pass therethrough without intermediate cooling.

10. Gas turbine power plant according to claim 1 wherein said high pressure branch flow of working medium is conducted from said recuperative heat exchanger to said boiler and has a temperature that is adjustable according to the dewpoint of the combustion gas.

11. Gas turbine power plant according to claim 1 wherein said compressor means is a radial compressor having adjustable inlet guire vanes, the output of said gas turbine being at least partly regulatable by adjusting said inlet guide vanes.

References Cited
UNITED STATES PATENTS 2,714,289    8/1955    Hofmann.

MARTIN P. SCHWADRON, Primary Examiner

R. R. BUNEVICH, Assistant Examiner

U.S. Cl. X.R.

60—59

PO-1050 (5/69)

UNITED STATES PATENT OFFICE
CERTIFICATE OF CORRECTION

Patent No. 3,511,046      Dated May 12, 1970

Inventor(s) HANS-PETER SCHABERT

It is certified that error appears in the above-identified patent and that said Letters Patent are hereby corrected as shown below:

In the heading the German priority number should read as follows:--P 16 01 659.4--

SIGNED AND
SEALED
NOV 24 1970

(SEAL)
Attest:

Edward M. Fletcher, Jr.
Attesting Officer

WILLIAM E. SCHUYLER, JR.
Commissioner of Patents